Feb. 26, 1957 N. C. BRETL 2,782,550
BAIT HARNESS AND FISHHOOK
Filed Aug. 2, 1955
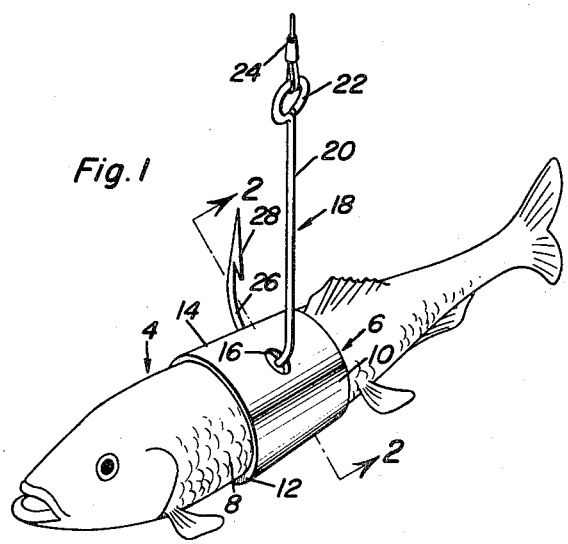
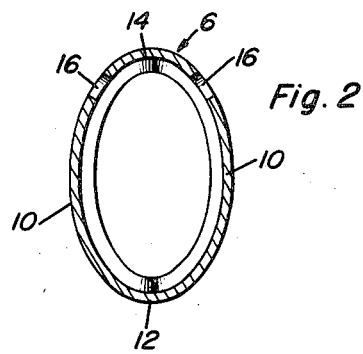
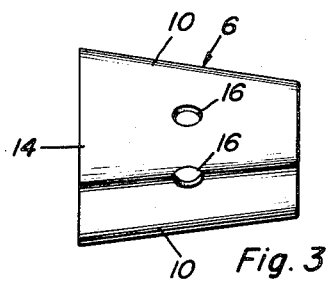
Norbert C. Bretl
INVENTOR.

United States Patent Office 2,782,550
Patented Feb. 26, 1957

2,782,550
BAIT HARNESS AND FISHHOOK

Norbert C. Bretl, Stevens Point, Wis., assignor of fifty percent to Clifford W. Peickert, Stevens Point, Wis.

Application August 2, 1955, Serial No. 525,916

2 Claims. (Cl. 43—44.4)

This invention relates to fishing tackle, generally speaking, and has reference in particular to a bait, a rigid harness, an endless band, for example, and a fishing line with a fishhook thereon and with the fishhook piercing the bait and securely anchored in place on the bait by way of the stated harness.

More specifically, the invention has to do with an ovate band of plastic or other material which conforms in general shape to the cross-section of the body portion of the bait which it encompasses, the same having side portions, dorsal and ventral end portions all snugly embracing the encircled bait, the side portions at places adjacent said dorsal portion having aligned holes allowing the barbed bill or bend of the hook to pass therethrough and also through the intervening dorsal portion of the bait.

Other objects, features and advantages will become more readily apparent from the following description and the accompanying sheet of drawings.

In the drawings:

Figure 1 is a perspective view of the combination; namely, the bait, embracing and reinforcing band and the anchored fishhook;

Figure 2 is a section, slightly enlarged, on the line 2—2 of Figure 1; and

Figure 3 is a plan view of the band by itself.

Referring now to the drawings, and in particular to Figure 1, the bait is denoted by the numeral 4, and this is, of course, the essential component of the over-all combination. Sometimes, this sort of a combination is treated as a lure in that it comprises, additively, a bait either live or artificial, a fishhook, and means for joining the fishhook to the bait in a manner so that the barbed bill will be in position to make the catch. More specifically, however, the bait is generally a live minnow and the harness is the aforementioned ring or endless band 6. This could be of commercial plastics or a suitable preferably non-corrodible metal. It is sometimes treated as a truncated cone, but is actually a simple endless broad open ended band which slips up over the tail and onto the intermediate body portion 8 of the bait. The band may be said to comprise a pair of diametrically opposite curvate side portions 10, a ventral portion 12 and a dorsal or saddle portion 14. The ladder bridges over the dorsal part of the minnow, and the side portions adjacent thereto are provided with holes 16 which are suitably aligned to permit passage of the companion part of the fishhook therethrough. The fishhook is denoted at 18 and comprises a shank 20 with a hook 22 to accommodate the fishing line 24. The hook proper, sometimes called the curvate bend, is denoted at 26, and this has a terminal barb 28. This barbed hook or bend passes through the holes 16, 16 and also the intervening dorsal part of the bait, all as brought out in Figure 1.

When the harness is around the bait, it reduces the likelihood of the loss of the minnow or other live bait by nibbling where a fish usually can pull the bait off a hook as the hook sometimes tears out of the dorsal part quite easily when just the hook is used. Another advantage is that in casting, the fisherman frequently throws the minnow or live bait off when just a hook is stuck through the back, losing the bait. This type of a band may be in colors to itself serve as a sort of a lure. Another advantage is that the bait, if alive, will live longer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use when fishing, a live bait, an endless rigid band embracing and stabilizing the body portion only of said bait somewhat midway between the head and tail portions of said bait and having fishhook anchoring holes therein, and a conventional fishhook having a shank with a curvate bend and terminal barb at one end passing through said body portion and holes in said band, whereby to thus securely join the bait to the band, or vice versa, and the fishhook to said body portion, said band being snug-fitting and conformable in shape, generally speaking, to the portion of the bait which is encircled and embraced thereby.

2. For use in conjunction with a live minnow, a relatively broad body embracing endless band having ventral, dorsal and side portions, said side portions adjacent to but on opposite sides of said dorsal portion, having substantially diametrically opposite holes registering and adapted to permit the barbed bend of a conventional fishhook to pass therethrough and also through the dorsal portion of the stated minnow, said band being of truncated conical open-end form and generally ovate in cross-section.

References Cited in the file of this patent

UNITED STATES PATENTS

| 1,010,481 | Crane et al. | Dec. 5, 1911 |
| 2,292,743 | Cordry | Aug. 11, 1942 |

FOREIGN PATENTS

| 512,640 | Canada | May 10, 1955 |